3 Sheets—Sheet 1.

G. ESTERLY.
HARVESTER.

No. 193,234. Patented July 17, 1877.

Witnesses:
Will A. Dodge
Donn J. Twitchell

Inventor:
George Esterly,
By his attys
Dodge & Son

3 Sheets—Sheet 2.

G. ESTERLY.
HARVESTER.

No. 193,234. Patented July 17, 1877.

Witnesses:
Will W. Dodge
Donn P. Twitchell

Inventor:
George Esterly
By Dodge & Son
Attys.

3 Sheets—Sheet 3.
G. ESTERLY.
HARVESTER.
No. 193,234. Patented July 17, 1877.
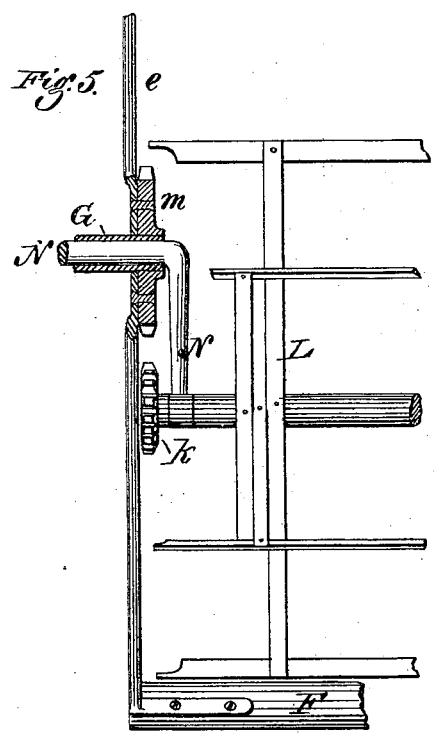
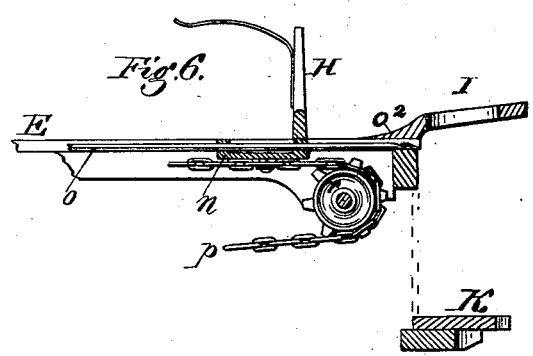
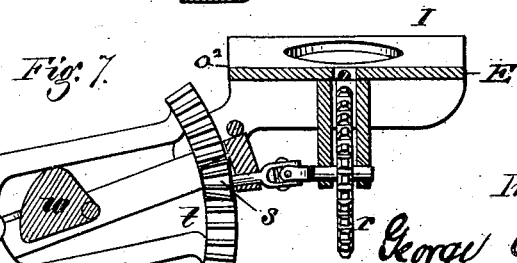
Witnesses:
Hill H. Dodge
Donn J. Mitchell
Inventor:
George Esterly
By his attys
Dodge & Son

UNITED STATES PATENT OFFICE.

GEORGE ESTERLY, OF WHITEWATER, WISCONSIN, ASSIGNOR OF ONE-HALF HIS RIGHT TO GEORGE WASHINGTON ESTERLY, OF SAME PLACE.

IMPROVEMENT IN HARVESTERS.

Specification forming part of Letters Patent No. 193,234, dated July 17, 1877; application filed February 29, 1876.

*To all whom it may concern:*

Be it known that I, GEORGE ESTERLY, of Whitewater, in the county of Walworth and State of Wisconsin, have invented certain Improvements in Harvesters, of which the following is a specification:

My invention consists in the combination of a tubular rake-shaft and a reel-supporting arm passing through the same; in a peculiar manner of adjusting and driving the reel; in the combination of a reel, and a rake revolving partly around and partly within the same.

My machine consists essentially of a rigid frame mounted on two wheels, and provided with a concave main platform; a rake, which sweeps the grain off over the rear edge of the main platform; a rear platform, to receive the grain as it is delivered from the front one; a reciprocating rake mounted on the rear platform, and delivering the grain in bundles at the two ends of the same alternately; and binders' stands and tables, located at the two ends of the rear platform, so that the grain can be readily caught and bound by two attendants on opposite sides of the machine.

Figure 1:
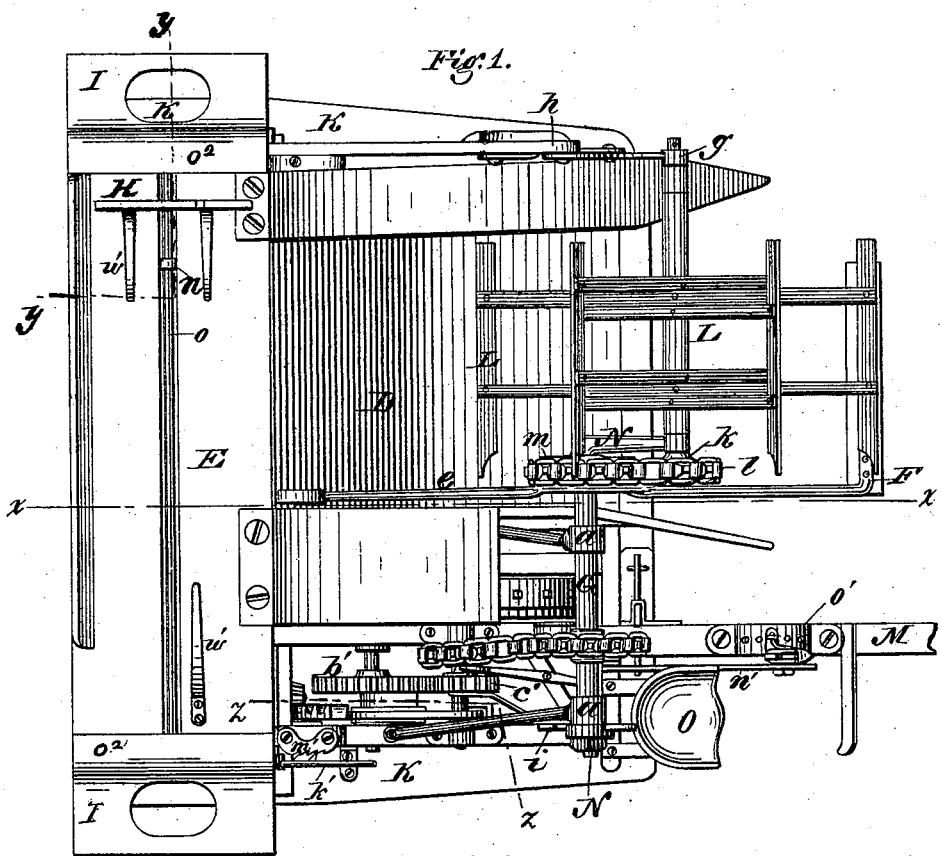
Figure 2:
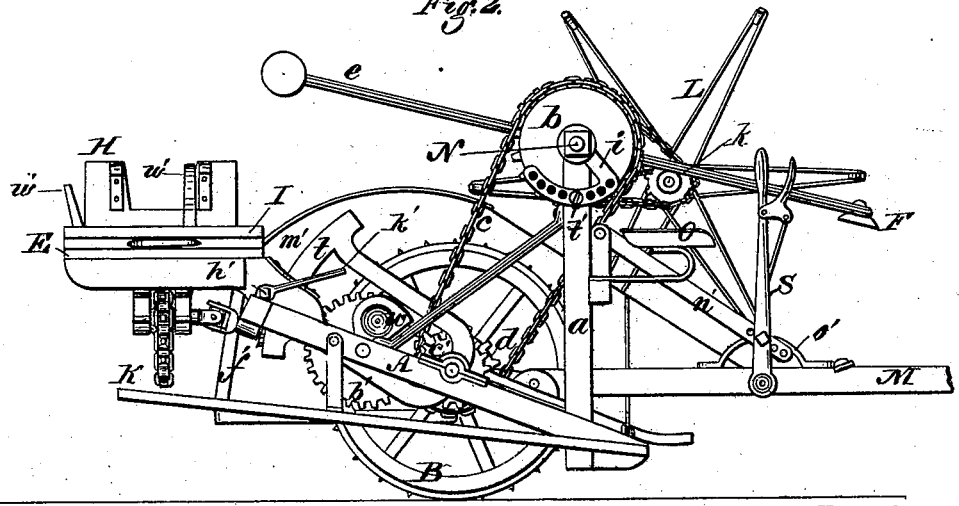
Figure 3:
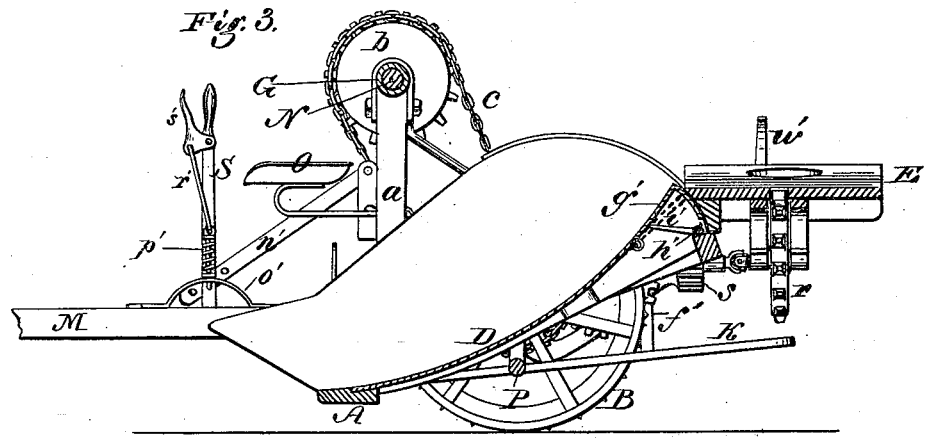
Figure 4:
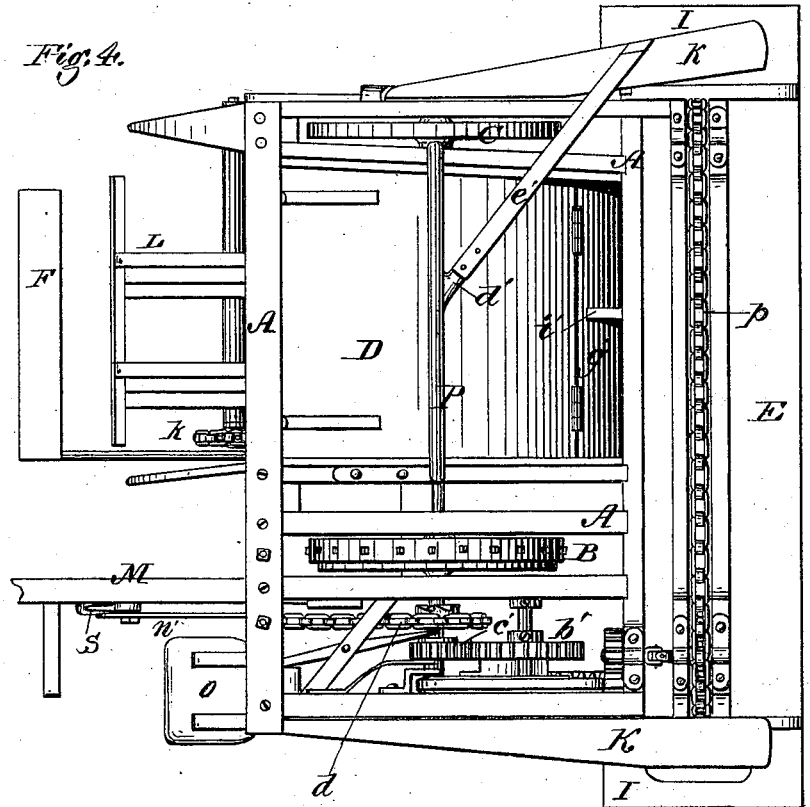

Figure 1 represents a top plan view of my machine; Fig. 2, a side elevation of the same; Fig. 3, a vertical section of the same on the line $x\, x$, Fig. 1; Fig. 4, a bottom plan view of the machine; Fig. 5, a horizontal section through one end of the reel-shaft, showing the manner in which the reel-sustaining arm is arranged; Fig. 6, a vertical section on the line $y\, y$ of Fig. 1, showing the arrangement of the outer binders' table and stand, and the manner in which the reciprocating rake is arranged; Fig. 7, a vertical section on the line $z\, z$, Fig. 1, showing the mechanism by which the reciprocating rear rake is actuated.

A represents the rigid main frame of the machine, made in a rectangular form, and mounted in an inclined position upon the driving-wheel B and supporting-wheel C, the former at the inner and the latter at the outer side, as shown in Fig. 4. D represents the main platform, secured rigidly in the frame and curved upward from front to rear. E represents the rear transverse platform, attached to the main frame along the rear side of the platform D, to receive the grain as it is swept from the latter by the rake. F represents the main rake or rake-head, attached to an arm of a horizontal rotating shaft, G, by which it is caused to sweep over the face of the platform from front to rear and deliver the grain therefrom upon the rear platform. H is the reciprocating rake or carrier, mounted upon the rear platform E, for the purpose of delivering the grain in bundles at the two ends thereof alternately. I I are the two binding-tables, secured to the ends and above the surface of the rear platform E, to receive the grain and support it while being bound by hand. K K are the two stands or platforms upon which the binders ride, located one below each table I, and attached to the main frame. L is the reel, of any ordinary construction. M is the tongue or draft-pole of the machine. The rake-shaft G is made hollow or tubular, and mounted in bearings at the upper ends of two standards, $a$, which are secured rigidly on the front side of the inner end of the main frame, as shown in Figs. 1 and 3. At its middle the shaft is provided with a sprocket-wheel, $b$, driven by a chain, $c$, from a sprocket-wheel, $d$, mounted on the axle of the driving-wheel B, as shown in Figs. 1 and 2.

By the above arrangement of parts a continuous rotary motion is imparted to the rake-shaft and head, and the latter caused to travel at each revolution closely over the face of the main platform from front to rear.

In order to counterbalance the rake-head and render the action of the rake smooth and easy, a weighted arm, $e$, is extended from the rake-shaft in a direction opposite the head, as shown in Figs. 1, 2, and 5.

Through the tubular rake-shaft G I pass loosely a rod, N, having one end bent at a right angle to form a crank-arm, which is provided at its extremity with an eye or bearing to receive one end of the shaft of the reel L, as clearly represented in Figs. 1 and 5, said shaft being sustained at the opposite end by an adjustable arm, $g$, attached to a standard, $h$, on the outer side of the main frame, as shown in Fig. 1, so that the outer end can be adjusted to correspond with the inner.

By mounting the end of the reel-shaft in the cranked or bent arm of the rod passing through the rake-shaft, I am enabled to throw the axes of the reel and rake out of line with each other to raise and lower the reel, for the purpose of adjustment, or to keep the chain tight by simply turning the rod without affecting the rake, and to drive the reel and rake at different rates of speed.

It will be observed that the rake-arm revolves past the end of the reel, and that, although the rake head describes a much larger circuit than that of the reel-blades, still, owing to the eccentric arrangement of the rake and reel, or, in other words, owing to the fact that the axes of the rake and reel do not coincide, the rake-head is caused to travel during its downward and backward movement within the circumference of the reel, and during the remainder of its rotation outside of the same. This arrangement permits the combination of the reel with a rake revolving around the same, and at the same time permits the two to work in the required proximity to the platform.

The reel-sustaining rod N has rigidly secured to its inner end a curved arm, $i$, provided with a series of holes, through one of which a bolt, $t'$, is inserted into the standard $a$, so as to fasten the arm, and thereby hold the rod N and its cranked end in which the reel bears.

By removing the bolt moving the arm $i$ and inserting the bolt through another hole, the reel-sustaining arm or end of the rod may be held in any position desired, and thus the height of the reel readily controlled.

The reel-shaft is provided at its inner end with a pulley, $k$, and is driven by a chain, $l$, from a pulley, $m$, on the end of the tubular rake-shaft, as clearly shown in Figs. 1, 2, and 5.

In the present instance the pulleys are so proportioned that the reel rotates more rapidly than the rake; but the speed may be increased or diminished by a change of gear.

When it is desired to have the reel and rake driven independently of each other, so that either may be stopped at will without stopping the other, a sleeve or tube may be mounted within the shaft G around the rod N, motion communicated thereto in any suitable manner, and the reel-driving pulley $m$ attached to its end instead of to the rake-shaft.

Across the rear side of the machine I secure a flat rear platform, E, to receive the grain as it is delivered from the main platform by the rake F. On this rear platform I mount a reciprocating rake or carrier, H, which, moving to and fro over the said platform, gathers the grain into bundles, and delivers the same first at one end and than at the other of the platform.

At each end of the platform I secure a binding-table, I, having a central hole to admit the body of the binder, and below each table to the main frame I secure a stand or platform, K, to carry the binder, the two binders standing on opposite sides of the machine, facing each other. The binding-tables are elevated above the surface of the platform E, and have their inner edges $o^2$ beveled or inclined downward thereto, so that the grain can be drawn from the platform up to the binder, who stands in the hole or opening made in the center of the table I, as shown in Fig. 1, the table thus serving as a support for the binder, and preventing him from being accidentally displaced from the foot-board or platform K. As it is desirable to have the receiving-table E as low as possible, so that the grain may be more readily delivered thereon, and be less liable to be thrown off backward, or carried up over by the rake, and as it is also desirable to have the tables I raised high enough to come above the knees of the binder, in order to afford him a better support, I arrange the tables I some six inches or more above the table E, and connect them thereto by the incline $o^2$, as shown in Fig. 6, thus accomplishing these several objects, and at the same time providing a smooth surface, on which the grain can be easily moved by the binder, as he may find necessary.

The reciprocating rake H is secured at its lower edge to a metal block, $n$, sliding on a guide-rod, $o$, mounted in a longitudinal groove in the rear platform E, as shown in Figs. 1, 4, and 6. The sliding block $n$ is attached to an endless reciprocating chain, $p$, which is mounted on two pulleys, $r$, located under the ends of the platform E, as shown in Figs. 3, 4, and 6. The manner in which the reciprocating motion is imparted to the chain and rake is clearly represented in Fig. 7, in which it will be seen that the shaft of one of the chain-carrying pulleys $r$ is provided with a pinion, $s$, acted upon by a pivoted segmental rack, $t$, which latter is provided with a central opening, and operated by a cam or eccentric, $w$, revolving in said opening, as shown. The rotation of the cam imparts a vibratory motion to the rack, which, in turn imparts a reciprocatory motion, through the pinion-pulley and chain, to the rake. The cam $w$ is mounted on a shaft in rear of the main axle, and is provided with a pinion, $b'$, driven by a pinion, $c'$, on the axle, as shown. The binders' stands K each consist of a long plank attached to the main frame, with the rear end below the binding-table.

By locating the driver and one binder on the outside of the driving-wheel, and the other binder at the opposite side of the machine, as shown in Fig. 1, they are made to nearly or quite counterbalance each other, the difference in distance from the bearing or driving-wheel compensating for the difference in weight on the two sides.

The seat is, in the present instance, attached to a cross-bar secured to the rigid reel-standards $a$, as shown in Figs. 1 and 2; but it may be sustained by a special standard, or in any other suitable manner, on the front of the frame.

In order to prevent the weight of the binder at the outer or grain side of the machine from straining and twisting the frame, I brace his stand K and the frame in the manner represented in Figs. 3, 4, and 6.

An iron bar, P, is placed across the under side of the main frame, and bolted at one end firmly to the same near the driving-wheel B, while at its opposite end it is bent upward, and provided with an eye, through which the axle of the outer supporting-wheel C is passed, or may be pivoted or bolted to the wheel-timber, as shown in Figs. 3 and 4. Near its middle the rod P is provided with an oblique horizontal arm, $d'$, to which there is rigidly secured one end of a wooden bar, $e'$, which has its opposite end attached to the under side of the outer binders' stand K, as shown in Figs. 2, 4, and 6. An upright bar, $f'$, is also secured at one end to said binder's stand, and at the other to the main frame, as shown in Figs. 1, 2, and 4. By thus bracing and sustaining the outer binder's stand, it is supported firmly in position, and the weight of the binder thereon, prevented from twisting the frame out of shape, or throwing the other parts out of position.

In order to insure a clean delivery of the grain from the main platform under all circumstances, the rear edge of the platform is hinged, as shown in Figs. 3 and 4, so that it can rise and fall, and the rear edge of the hinged portion $g'$ curved, as shown in Fig. 3, so as to remain in close contact with the rear platform notwithstanding its movement on the hinges. The elevation of the hinged edge $g'$ is effected by means of a rock-shaft, $h'$, mounted in the main frame, and provided with an arm, $i'$, at the middle, to act upon the hinged section, and with a handle, $k'$, at one end, by which to turn it. When the arm $i'$ is raised it elevates the hinged edge, but when it is lowered the edge falls of its own weight. By raising the rear edge of this section $g$ the grain will be thrown farther back on the table E by the rake F, and, therefore, when the grain is long or very heavy, it is raised, and when the grain is short or light the section is lowered even with the edge of the table E. By this means the delivery of the grain upon the table E can be regulated perfectly.

In order to secure the edge at the required elevation a rack-bar, $m'$, is attached to the main frame for the purpose of locking the handle $k'$ in position, as shown in Fig. 1.

The draft-pole or tongue M of the machine is hinged to the main frame A forward of the axle, and is provided with a hand-lever, S, which is connected by a link or bar, $n'$, to a plate secured upon a cross-bar attached to the rigid reel-standards $a$, as shown in Figs. 2 and 3, so that, by moving the hand-lever while the tongue is held fast, the main frame can be tipped or tilted on the axle, so as to raise or lower the cutting devices, which will be arranged as usual at the front edge of the frame.

On the tongue there is secured a curved perforated plate, $o^1$, to receive a locking-bolt, $p'$, which is arranged to slide in lugs on the side of the hand-lever S, as shown in Figs. 1 and 3, the bolt being forced down by means of a spiral spring, and raised by means of a link, $r'$, connecting with a small elbow-lever, $s'$, pivoted to the upper end of the hand-lever, as shown.

When the machine is in action, the grain, being swept against the cutters by the reel, as usual, is severed and falls upon the main platform D, whence it is swept by the rake F upward upon the rear platform E, where it is caught by the reciprocating rake H, and delivered first at one end of the platform and then at the other in bundles, which are caught and bound by hand on the tables I by the two attendants riding on the stands K.

In constructing the machine the main rake may have two or more heads, F, if desired, and instead of having the reciprocating rake deliver the grain at both ends of the rear platform, it may be given a rapid motion, and arranged in such manner as to deliver all the grain at the inner end of the platform, in which case I propose to provide the rake and the platform with compressor-arms $w'$, as shown.

Having thus described my invention, what I claim is—

1. In combination with the tubular shaft G, having the rake-head F connected thereto, the rod N passed through said shaft, and having its end bent to form a reel-sustaining arm, as shown and described.

2. The combination of the tubular rake-shaft G, provided with the pulley $m$, the reel sustained by the rod N, and provided with the pulley K, and the chain $l$, as shown.

3. In combination with the rear platform E and the main rake F the front platform D, having its rear edge hinged to rise and fall, substantially as shown.

4. In combination with the hinged edge $g'$ of the platform the rock-shaft $h'$, provided with the arm $i'$ and handle $k'$.

5. In combination with the main frame A and the outer binders' stand K the rod P and bar $e'$, as shown.

6. The combination of a rake and a reel revolving in circular paths, having different centers, the path of the rake being partly within and partly without that of the reel-blades, as and for the purpose described.

7. The combination, in a harvester, of a reel and a rake, both rotating in a vertical plane, with their axis parallel, but not concentric, with each other, substantially as shown.

Witnesses:         GEO. ESTERLY.
  GEO. W. ESTERLY,
  E. P. BURROWS.